No. 753,789. PATENTED MAR. 1, 1904.
H. S. DUKES & W. H. CLAYTON.
WORK HANDLING MECHANISM FOR TYPE WRITING MACHINES.
APPLICATION FILED FEB. 8, 1902.
NO MODEL. 5 SHEETS—SHEET 1.
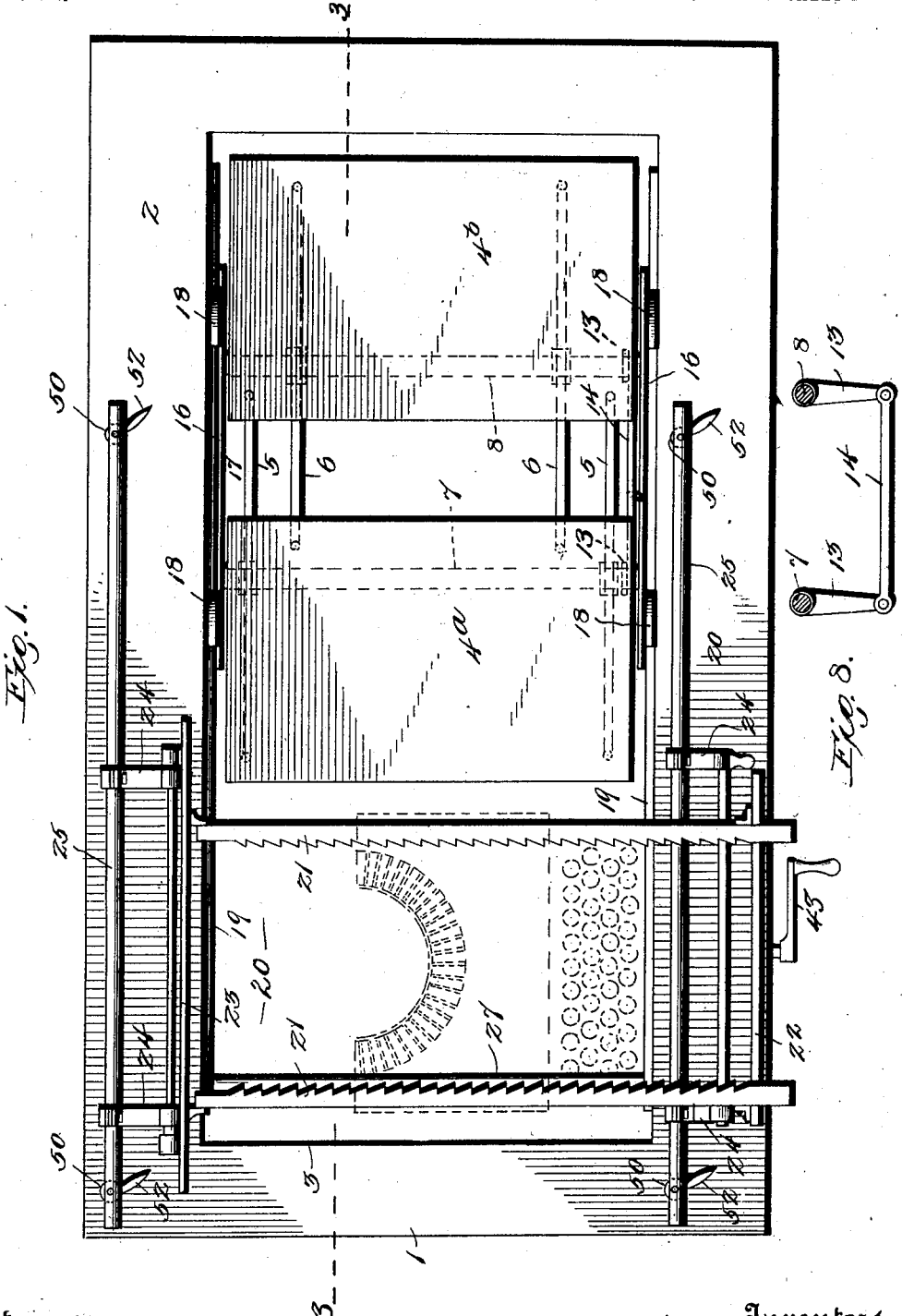
Witnesses
T. L. Mockabee
G. S. Roy
Inventors
Harry S. Dukes
William H. Clayton,
by S. T. Wolhaupter
Attorney No. 753,789. PATENTED MAR. 1, 1904.
H. S. DUKES & W. H. CLAYTON.
WORK HANDLING MECHANISM FOR TYPE WRITING MACHINES.
APPLICATION FILED FEB. 8, 1902.
NO MODEL. 5 SHEETS—SHEET 2.
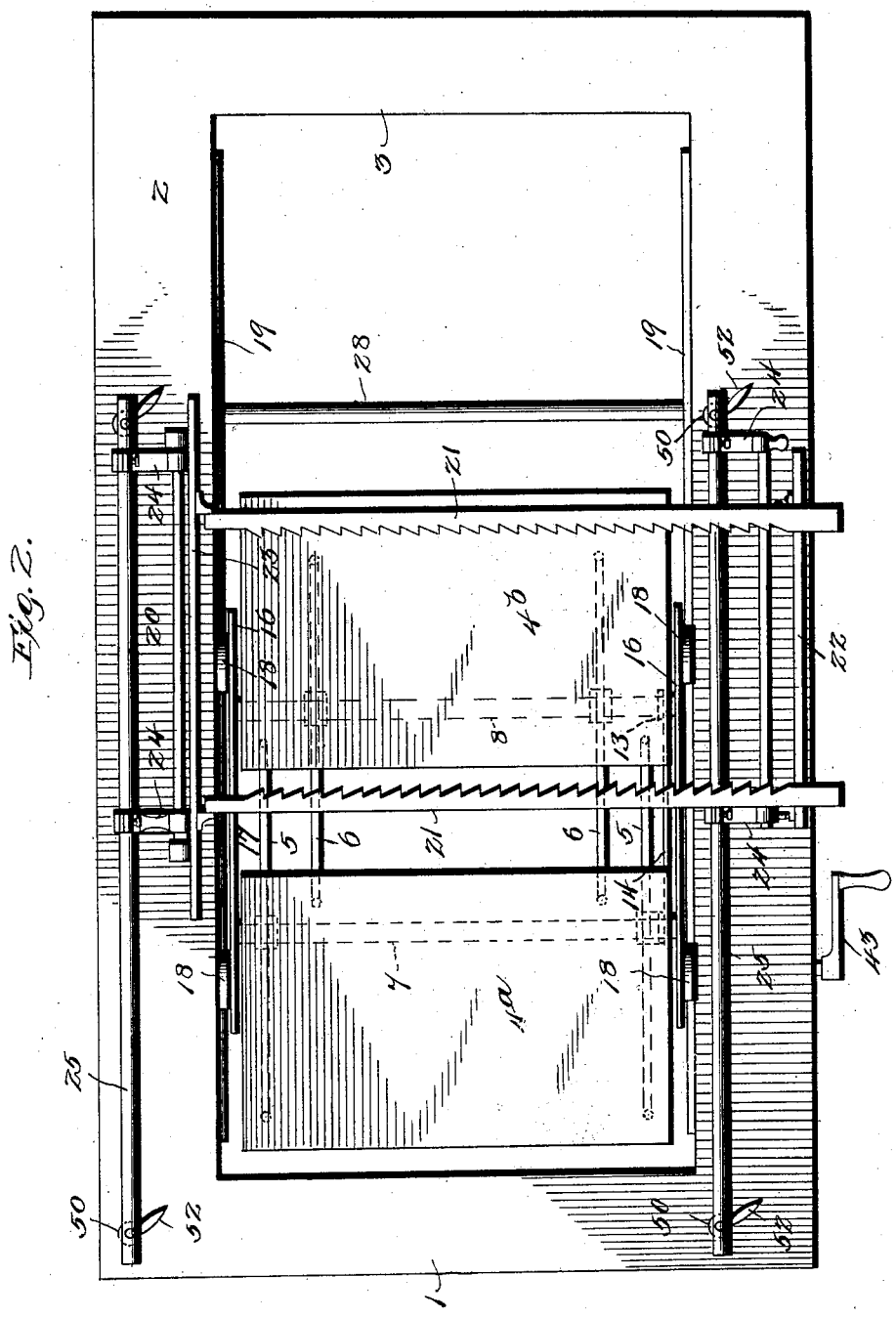
Witnesses
T. Lloyd Mockabee
G. S. Roy
Inventors
Harry S. Dukes
William H. Clayton,
by
D. T. Holhaupter
Attorney

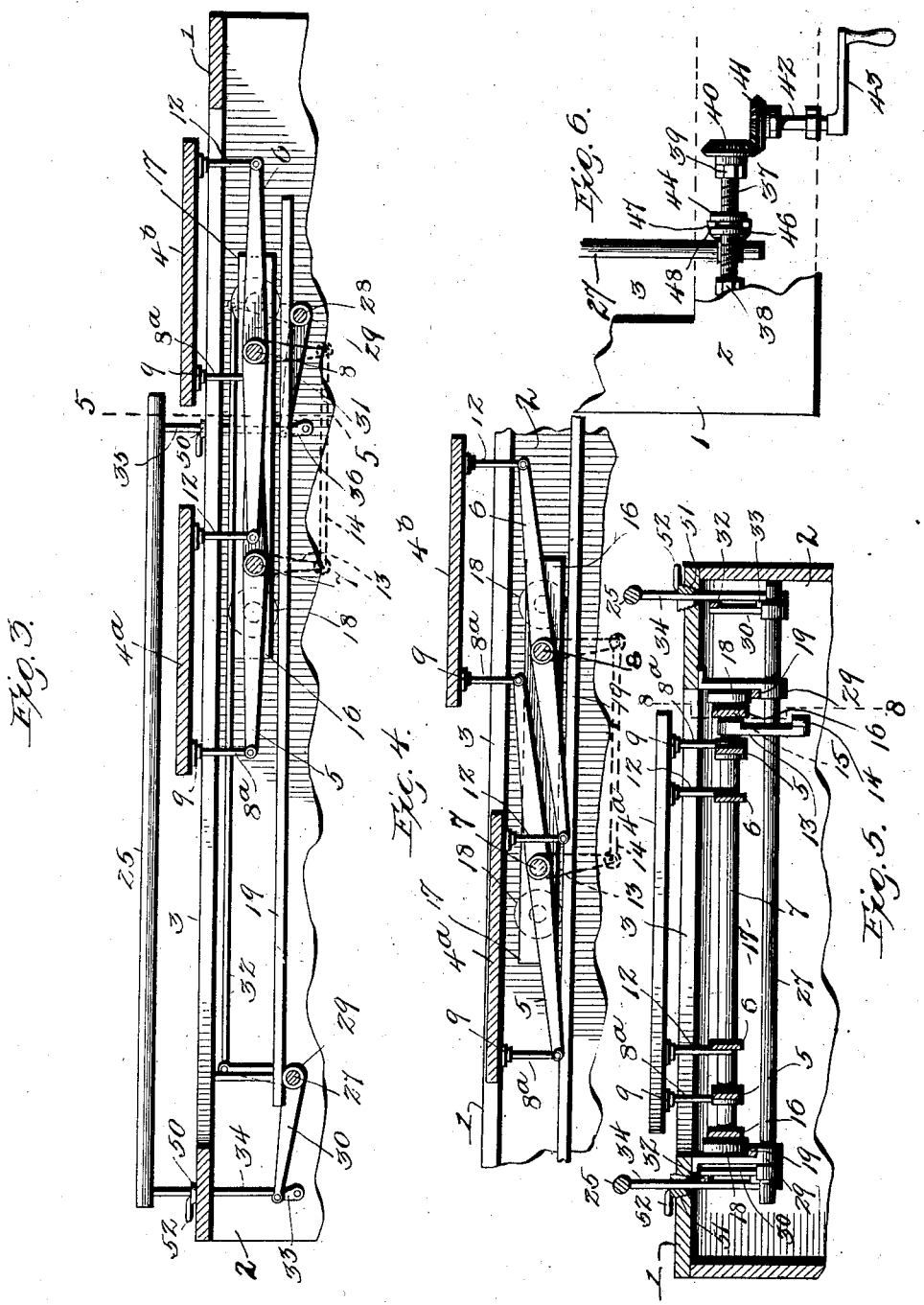

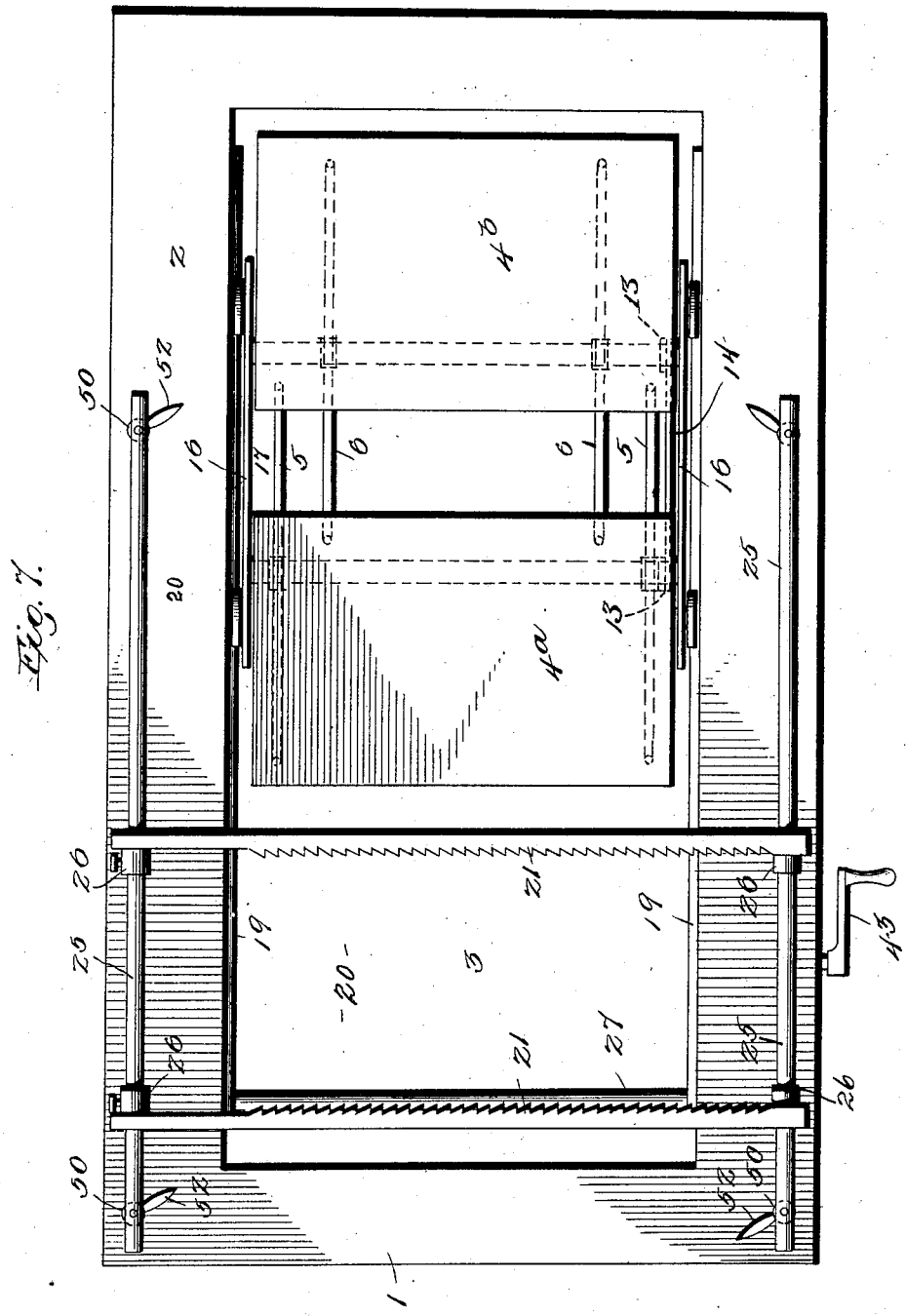

No. 753,789. PATENTED MAR. 1, 1904.
H. S. DUKES & W. H. CLAYTON.
WORK HANDLING MECHANISM FOR TYPE WRITING MACHINES.
APPLICATION FILED FEB. 8, 1902.
NO MODEL. 5 SHEETS—SHEET 5.
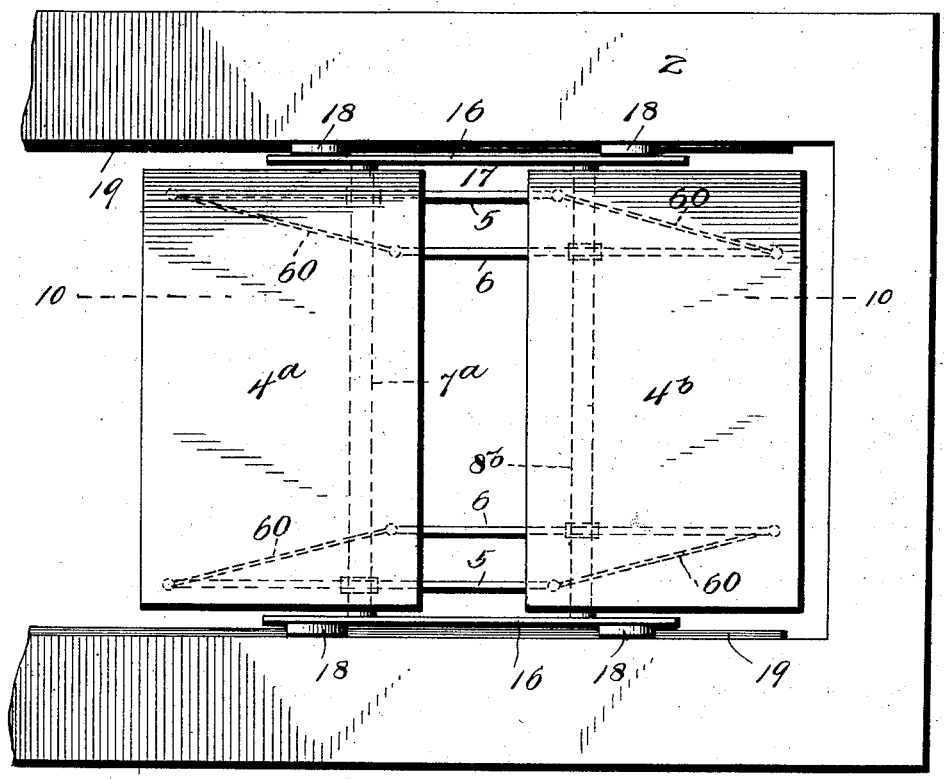
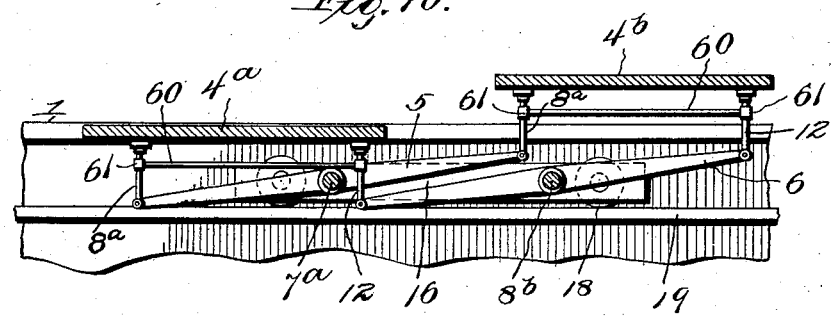

No. 753,789. Patented March 1, 1904.

UNITED STATES PATENT OFFICE.

HARRY S. DUKES AND WILLIAM H. CLAYTON, OF LITTLE ROCK, ARKANSAS, ASSIGNORS TO THE DUKES TYPEWRITER COMPANY, OF LITTLE ROCK, ARKANSAS, A CORPORATION OF ARKANSAS.

WORK-HANDLING MECHANISM FOR TYPE-WRITING MACHINES.

SPECIFICATION forming part of Letters Patent No. 753,789, dated March 1, 1904.

Application filed February 8, 1902. Serial No. 93,230. (No model.)

*To all whom it may concern:*

Be it known that we, HARRY S. DUKES and WILLIAM H. CLAYTON, citizens of the United States, residing at Little Rock, in the county of Pulaski and State of Arkansas, have invented certain new and useful Improvements in Work-Handling Mechanism for Type-Writing Machines, of which the following is a specification.
This invention relates to type-writing machines more particularly of the type commonly known as "book type-writers" and designed for printing upon the pages of books or other surfaces held in a flat or spread-out condition.
The special part of the type-writing machine to which the invention belongs is the means for supporting or holding the work in proper relation to the printing mechanism.

Therefore the invention contemplates improved work-handling mechanism comprehending not only means in the work-holder proper, but also in those parts of the machine-support coöperating with the said work-holder, whereby a complete means or mechanism for handling the work is provided that will insure the manipulation of the work and the printing mechanism with the greatest facility, while at the same time insuring a proper and accurate adjustment of the work in relation to the printing-plane.

Among more specific objects the invention has in view the provision of a simple and practical construction and arrangement of parts involving considerable economy in space by permitting the book to be cleared of the printing mechanism for the purpose of turning pages, &c., with a much shorter base or desk than heretofore possible with other work-holders, such as disclosed in our companion application for patent, filed November 14, 1901, Serial No. 82,228.

Also the invention comprises means which permits the operator to remain in the same position at the desk for either page of the book, inasmuch as the desired page to be printed upon can be brought beneath the machine or printing mechanism directly in front of the operator.

In connection with these specific objects the invention also provides means whereby either page of a book may not only be brought into proper position beneath the printing mechanism, but the latter, as well as the work-holder supporting the book or other work, may be moved or shifted to positions entirely outside of the printing zone, whereby the book or other work will be clear of the printing mechanism and the parts sustaining the same, thereby enabling the operator to freely turn the pages of the book or to completely remove or replace the same.

The invention further provides a construction and arrangement of parts wherein practical and self-acting means are provided for automatically maintaining the sheets or pages of a book on a common level or horizontal plane.

A general object of the invention is to cover such novel means in the work holding and handling means as are disclosed in said companion application, Serial No. 82,228.

With these and many other objects in view the invention consists in certain novel features of construction, combination, and arrangement of parts, as will be hereinafter more fully described, illustrated, and claimed.

The novel and useful combinations embraced in the invention, as well as the structural expedients utilized in carrying into effect the objects sought for, are necessarily susceptible to a wide range of modification without departing from the spirit or scope of the invention; but the preferred embodiments of improvements are shown in the accompanying drawings, in which—

Figure 1 is a top plan view of a book type-writing-machine support and work-holder constructed in accordance with the present invention and showing the shiftable machine-supporting frame and the shiftable work-holder arranged so that free access may be had to the work-holder for the purpose of replacing or removing a book or for turning the pages thereof. Fig. 2 is a similar view illustrating the machine-supporting frame and the work-holder shifted to positions for bringing the printing mechanism over one page of the book or work sustained by the work-holder. Fig. 3 is a longitudinal sectional view on the line 3 3 of Fig. 1, showing the preferred construction of the self-leveling work-holder. Fig. 4 is a detail sectional view similar to Fig. 3, showing the rest-tables of the work-holder at different elevations to illustrate more plainly the action of the leveling-levers associated with and supporting the said tables or rests. Fig. 5 is a transverse sectional view on the line 5 5 of Fig. 3. Fig. 6 is a detail sectional view showing one construction of operating device for the raising and lowering mechanism associated with the adjustable base-rods. Fig. 7 is a plan view similar to Figs. 1 and 2, showing a modification in which the longitudinal guides of the main supporting-frame for the machine are mounted directly upon the main base-rods. Fig. 8 is a detail sectional view on the line 8 8 of Fig. 5, showing the preferred form of coupling connection between the rocking supports or shafts of the leveling mechanism to insure a synchronous action of the parts. Fig. 9 is a plan view of the work-rests and their mountings, illustrating a modification in which the leveling-levers may be pivotally swung upon fixed or stationary supports and also suggesting another mechanical expedient which may be resorted to for coupling together the separate sets of leveling devices to insure synchronous horizontal movement of the rests. Fig. 10 is sectional view on the line 10 10 of Fig. 9.

Like reference-numerals designate corresponding parts throughout the several views of the drawings.

A great advantage is derived in a book typewriting machine from the employment of a work-holder comprising means for automatically maintaining the sheets or pages of a book at a common level or horizontal plane, and the present invention therefore contemplates as one of the distinctive objects thereof a simple, practical, and positively-acting combination of parts insuring a perfect self-leveling of the work to be operated upon by the printing mechanism. This construction, which provides for the self-leveling or automatic balancing operation, is necessarily susceptible to embodiment in a variety of combinations with different kinds of type-writing-machine supports; but inasmuch as the construction claimed possesses special utility when associated with means for permitting the work-holder to be independently shifted with relation to the supports for the printing mechanism it has been deemed sufficient for illustrative purposes to confine the description of the self leveling or balancing devices of the work-holder to one of a shiftable or traveling type.

In the preferred construction and use of the work-holder, as above referred to, the same is associated with a suitable type-writing-machine base 1. As illustrated in the drawings, this type-writing-machine base is preferably the table-top of a suitable typewriter cabinet or desk 2, but may necessarily be any type of base adapted for supporting the framework and frame parts upon which the traveling printing mechanism is sustained as well as for the proper support and movement of the type of work-holder employed in carrying out the invention. In connection with the form of work-holder shown in the drawings the base or table-top is provided therein with an opening 3, extending substantially the full length of the said base or table to provide for accomodating the work-holder in any of its variously-shifted positions, and this work-holder essentially comprises in its general organization a pair of vertically-movable or rising and falling horizontal work-rests $4^a$ $4^b$. These work-rests $4^a$ $4^b$ are in the form of flat leaves or platforms arranged in spaced relation with a sufficient interval therebetween to accommodate the "hub" of the book, whereby the opposite pages of a spread-open book will respectively rest upon the oppositely-located rests $4^a$ $4^b$. The latter are designed to be positively coupled or yoked together in such a way as to permit of the automatic rising and falling thereof, according to the weight of the pages thereon, while at the same time insuring a synchronous movement or adjustment of the two rests respectively in opposite directions, whereby the book will automatically level itself and bring both pages into a common horizontal plane. The preferred means employed for thus coupling or yoking together the synchronously-movable work-rests $4^a$ $4^b$ are shown in the drawings and essentially consist of separate sets of leveling-levers associated with both work-rests and having a movement in absolute synchronism. The separate sets of leveling-levers are designated, respectively, by the reference-numbers 5 5 and 6 6. These levers are respectively mounted fast upon rocking supports 7 and 8, preferably in the form of rock-shafts, extending beneath the oppositely-located rests $4^a$ $4^b$ and journaled at their ends in suitable bearings 15, provided in or on the oppositely-located frame-pieces 16, which constitute bearing-supports for the said rock-shafts and which will be more particularly referred to in connection with the shiftable or traveling support preferably provided for the work-holder. For convenience in setting forth the proper relation of the parts of the work-holder the separate rests have been designated, respectively, by the reference characters $4^a$ $4^b$. As illustrated, the pair or set of leveling-levers 5 5 are mounted upon the rocking support or shaft 7, intermediate their ends, said rocking support or shaft 7 being located beneath the rest $4^a$. At one end the oscillatory leveling-levers 5 5 have pivotally connected thereto the carrying-links $8^a$, which are in turn suitably connected, as at 9, to the work-rest $4^a$ at or contiguous to the outer edge of said rest, while the opposite ends of the levers 5 5 have similar link connections with the other work-rest, $4^b$, at or contiguous to the inner edge thereof. The other set of leveling-levers, 6 6, are associated with the rocking support or shaft 8 beneath the work-rest $4^b$, and at one end the said levers 6 6 have the link connections 12 with the rest $4^b$ at or contiguous to the outer edge thereof and at their opposite ends have similar link connections with the other rest, $4^a$, at or contiguous to the inner edge of the latter, thus completing duplicate sets of connections between the leveling-levers and the two work-rests. In regard to the links $8^a$ and 12 it is of course understood that while the same have a pivotal connection with the leveling-levers the connection with the rests is sufficiently loose or of such a nature that the necessary play of the links is permitted, and yet the latter are maintained at all times in a substantially vertical position.

From the construction already described it is obvious that the inner and outer edges of both work-rests $4^a$ and $4^b$ are designed to be maintained in true horizontal planes and that the said rests by reason of the leveling devices and the coupling means, presently referred to, will rise and fall in true synchronism, and one of said rests will fall while the other rest will rise to adjust itself to a book placed upon the holder. When a book is placed in position upon the work-holder and thrown open, the separate rests will necessarily adjust themselves to the weight thereon. In other words, an automatic leveling of the work is insured, and in explanation of the action involved it may be briefly stated that as the two sides of books are connected by a hub the moment the rest which sustains the lighter weight tends to rise above the point where the opposite pages are level the weight of the book is brought against the inner edge of such rest, and for the latter to proceed farther in an upward direction the same would be compelled to raise the thick side of the book off the opposite rest, pulling against the hub of the book. This throws the weight against the inner edge of the said rest sustaining the lighter weight, which edge is in balance with the outer edge of the opposite rest sustaining the heavier weight. Therefore these two edges of the opposite rests—i. e., the inner edge of one and the outer edge of the other—will come to a level at the point where the weight upon the two edges is the same. As the rests must remain horizontal because of the coupling of the leveling devices, as presently explained, the practical effect is to keep the opposite pages of the open book in the same horizontal plane. In short, the leveling devices in connection with the rests upon which the work is placed provide a self-leveling work-holder comprising means wherein the lighter side of the book must elevate the heavier side thereof through the medium of the hub before the lighter side could rise to a higher level than the heavier side, thus positively insuring a perfect leveling of the opposite pages of the book placed upon the holder.

The leveling devices associated with the separate rests necessarily include, as already indicated, suitable coupling means to insure the synchronous movement of the rests and which will prevent the latter assuming other than a horizontal plane. Different mechanical expedients may be resorted to for accomplishing this result. However, a preferable and simple expedient is shown in the drawings as consisting of fitting to the rocking supports or shafts 7 and 8 the shaft-arms 13, which are pivotally united or yoked together by an intermediate coupling or connecting bar 14. The coupling connections 13 and 14 positively cause a synchronous and similar movement of both sets of leveling-levers and insure the synchronous movement of the rests. The shaft-arms 13 may be associated with the rocking supports or shafts 7 and 8 in any convenient way or position, but are preferably indicated as being pendent from the shafts and located entirely out of the way of the operator as well as out of sight within the desk or cabinet.

The supports 7 and 8 have been preferably referred to as of the "rock-shaft" type turning in bearings 15 in the oppositely-located supports or frame-pieces 16; but obviously the bearing-supports for the said rock-shafts may be a fixed part of the base or desk without affecting the self-leveling action of the work-holder. However, as the self-leveling form of work-holder described possesses special utility, in combination with a shiftable support and also assocated with the shiftable machine-support to be presently referred to, the preferable mounting of the work-holder is shown in the drawings and consists in having the bearing-supports 16 for the rock-shafts 7 and 8 in the form of frame pieces or bars, which may or may not be suitably braced together, but which constitute the frame of a shiftable carriage 17 for the work-holder. This shiftable carriage provides a traveling support for the self-leveling work-holder, whereby the same may be shifted readily from right to left, and vice versa, throughout the entire length of the work-holder opening 3, formed in the base or table-top 1. Any suitable mounting may be provided for the carriage-frame 17. Sliding, rolling, or other equivalent supports may be utilized in connection with the said shiftable carriage-frame 17; but the shiftable mounting is exemplified by the construction shown in the drawings, which simply consists in providing the frame pieces or sides 16 of the carriage-frame with traveler rollers 18, riding upon the track-rails 19, arranged longitudinally of the base 1, preferably within the opposite longitudinal side portions of the work-holder opening 3. This shiftable mounting of the work-holder does not interfere in the least with the action of the leveling devices associated with the rising and falling rests 4ᵃ 4ᵇ, while at the same time permitting the work-holder as an entirety to be easily and quickly moved from one position to another with but a slight effort on the part of the operator and without the necessity of the latter leaving the seat in front of the desk or cabinet.

As already stated, the transversely-shiftable feature of the work-holder, which provides for a shifting thereof longitudinally of the machine base or table-top 1, possesses special utility in combination with a similarly-shiftable machine-supporting frame of the type disclosed in our companion application, Serial No. 82,228, aforesaid. This combination is a very effective and practical one and of great advantage in book type-writing machines, inasmuch as through the medium of the self-leveling work-holder the opposite pages of an open book will always be level and maintained in the same plane, so that the machine may be readily shifted from one page of the book to the other during the printing operation without the necessity of readjusting the work until one page of the book has been completely printed upon.

It is understood that the printing plane will necessarily vary according to the thickness of the book to be printed upon, and it is therefore important in carrying out the invention to provide a machine-supporting frame which can be accommodated to any thickness of book, while also capable of convenient and ready elevation when it is necessary to raise the same from the work for any purpose—as, for instance, in shifting the entire mechanism from the printing zone of one page to the other or, in fact, entirely outside of the printing zone when the work is being either placed in position or removed from the work-holder. Referring particularly to the disclosure in the drawings, the main supporting-frame for the machine or printing mechanism is designated in its entirety by the reference-numeral 20, and it is not the purpose of the present invention to construct this frame essentially different from what is set forth in the companion application aforesaid. In its preferred aspect the main supporting-frame 20 usually consists of a pair of parallel longitudinal guides or guide-bars 21 and oppositely-located front and rear cross-bars 22 and 23, respectively, which connect the opposite end portions of the guides 21, and thereby form the complete frame. This frame is also characterized in the companion application as a "guide-frame," for the reason that it comprises in its general organization the guides upon which the tracks for the printing mechanism slide in the line-spacing movement; but as these features form no part of the present invention the same are not described or illustrated. In the present case the frame 20 is considered solely in its aspect as a main supporting-frame for the printing mechanism to provide for the convenient handling thereof in connection with the work supported by the transversely-shiftable work-holder.

In the preferred use of the invention an elevating-support is usually provided for the machine-supporting frame 20 independent of the main adjustable supports of the base and which elevating-support comprises means for the raising and lowering of the frame or framework 20 while approximately in a horizontal position and also embodies means whereby the frame in its elevated position above the work can be freely shifted laterally from one position to another over separate pages of a book or to a point entirely outside of the printing zone without disturbing the work or the shifting connection between the frame 20 and the main supports 25. Various instrumentalities may be utilized in effecting this elevating-support of the machine-supporting frame 20; but a simple and preferred construction is shown in Figs. 1 and 2 of the drawings, and consists in associating with the front and rear portions of the rising and falling frame 20 the vertically-swinging elevating-links 24, having suitable pivotal connection at one end with the frame or any of its attached parts and at their other ends loosely turning upon the main base-rods 25. The vertically-swinging elevating-links 24 also have free sliding engagement with said base-rods, so as to permit of the ready shifting of the frame longitudinally of the base-rods and the main base 1 or transversely in relation to the similarly-shiftable self-leveling workholder. The construction described provides for the raising and lowering of the entire machine-supporting frame through what may be properly termed a "bodily rising-and-falling arcuate movement" while upon oppositely-located supports. In other words, means are provided for effecting a synchronous elevation of the front and rear ends of the machine-supporting frame without lifting the same from the supports. By reason of thus providing for the independent bodily rising-and-falling movement of the main supporting-frame 20 it is obvious that such frame may be readily raised and lowered by the operator and conveniently shifted laterally in relation to the workholder with but a minimum effort. This is fully explained in the companion application aforesaid and is not claimed herein, except in so far as novel combinations are provided in connection with the transversely-shiftable workholder.

Even in carrying out the present invention the independent mounting of the machine-supporting frame 20 may be varied considerably without departing from the spirit or scope of the invention—as, for instance, as suggested in the modification shown in Fig. 7 of the drawings, the longitudinal guides 21 of the frame 20 may be mounted directly at their ends, as at 26, upon the main base or supporting rods 25, which latter rods will therefore serve as the cross-bars of the supporting-frame to make the complete framework for sustaining the machine or printing mechanism. In this modification it will of course be understood that the connection 26 at the ends of the frame-guides would be a sliding connection in order that the transverse shifting of the frame with the printing mechanism thereon could be effected for the purposes of the invention.

The main base-rods 25 are arranged above the base 1, contiguous to the front and rear edges thereof, and are designed to be vertically adjustable, and in the preferred construction the vertical adjustment of the said rods 25 is only utilized when books of greatly-varying thickness are placed upon the work-holder, inasmuch as the vertically-swinging elevating-supports 24 for the machine-supporting frame will necessarily compensate for the different elevations of books of the ordinary size. In adapting the base-rods 25 and the frame structure sustained thereon for use in combination with the shiftable work-holder of the character described the right-hand ends of the rods 25 preferably terminate at a point slightly to the right of the printing-plane, as plainly indicated in Figs. 1 and 2 of the drawings, while the left-hand ends of these rods are sufficiently far to the left to enable the machine or printing mechanism to be shifted entirely beyond the work-holder proper when the latter is in its extreme right-hand position. The effect of this is to economize space and permit of clearing the book for turning pages, &c., with a much shorter desk than heretofore possible, and, besides, the operator remains in the same position at the desk for either page of the book, it being simply necessary to raise the machine and push the self-leveling work-holder to the right or left, as the case may be, to bring the proper page under the machine. From the construction and arrangement of parts shown in the drawings it is obvious that by pushing the machine to the left a comparatively short distance and moving the work-holder or leveling device to the right the book is left entirely free and uncovered, whereby the operator may readily turn the pages without changing position. Also with such an arrangement of parts the work may be readily removed or replaced.

Reference has already been made to the fact that the front and rear base-rods 25, upon which is shiftably supported the machine-supporting frame 20, are vertically adjustable. This vertical adjustment of the rods is preferably only resorted to when books of very greatly varying thickness are placed upon the work-holder, but may obviously be employed, if desired, for raising the machine-supporting frame so as to clear the work for shifting purposes, although this is not the usual way of making use of the vertical adjustment of the said rods. However, for whatever purpose the vertical adjustment of the main base-rods 25 may be employed it is very desirable to provide means whereby these rods will be raised and lowered simultaneously and in true synchronism in order that uniform adjustment may be had for the front and rear end portions of the machine-supporting frame. The simultaneous and vertical adjustment of the main base-rods 25 may be accomplished in a variety of ways. Many mechanical expedients may necessarily be resorted to for securing this result. However, for illustrative purposes a simple and practical form of raising and lowering mechanism for the rods 25 is shown in the drawings. This form of raising and lowering mechanism involves in its general organization of parts a pair of oppositely-located rock-shafts 27 and 28. These rock-shafts may be conveniently arranged beneath the base or table-top 1 and are disposed transversely thereof, said shafts turning in suitable bearings 29, fitted to or provided upon the frame or desk part of the base or top 1. The said shafts 27 and 28 are arranged in opposite spaced relation and are respectively associated with the opposite end portions of the separate base-rods 25, and the said rock-shafts carry pairs of bell-crank levers 30 and 31, the pair of levers 30 being fitted to the shaft 27 and the other pair of levers 31 being fitted to the other shaft 28, as plainly shown in the drawings. The upstanding arms of the bell-crank levers 30 and 31 are coupled together by the connecting-bars 32, which insure a synchronous movement of the rock-shafts 27 and 28 and the bell-crank levers carried thereby. The horizontally-disposed arms of the bell-crank levers 30 have pivotal link connections 33 with the lower ends of the pendent rod-stems 34, extending upward through the base or table-top 1 and rigidly united with one end portion of the base-rods 25, while the opposite end portions of the said rods have pendent therefrom similar rod-stems 35, having similar pivotal link connections 36 with the horizontal arms of the bell-crank levers 31, carried by the other rock-shaft 28. By reason of the construction described it is obvious that if motion is imparted to either the rock-shaft 27 or 28 by any means the result will be the simultaneous and synchronous raising and lowering of the base-rods 25. Obviously any means for imparting motion to either rock-shaft may be employed. Out of a great variety of mechanical expedients which are available for this purpose a simple operating device for the raising and lowering mechanism is shown in Fig. 6 of the drawings. This operating device essentially comprises a screw-shaft 37, mounted in suitable oppositely-arranged bearings 38 and 39, fitted to the frame of the base or desk, whereby the said screw-shaft is held for a fixed rotation. This screw-shaft carries upon one end a bevel gear-wheel 40, meshing with a similar gear-wheel 41 at the inner end of an adjusting-shaft 42, extending to the front of the table or desk and carrying a suitable crank or handle 43, disposed in convenient proximity to the operator. Upon the screw-shaft 37 is mounted a traveling nut 44, preferably provided with an annular groove 46, loosely receiving the forked upper end 47 of a rock-arm 48, rigid with and arising from one of the rock-shafts conveniently from the shaft 27. The action of the operating device just described is apparent. By turning the handle 43 in either direction a corresponding motion is imparted to the screw-shaft 37, with the consequence of moving the traveling nut 44 one way or the other, and hence rocking both of the shafts 27 and 28 in unison. The rocking of the shafts 27 and 28 necessarily effects a simultaneous raising or lowering of the base-rods 25. With a screw-operating device of the character described for the raising and lowering mechanism the base-rods will necessarily remain stationary in either adjusted positions. In other forms of operating devices it would be necessary to provide other means for securing the base-rods fixed in an adjusted position; but in all forms of the invention it may be desirable to utilize such auxiliary holding means. A simple type of holding means for carrying out the function noted is shown in the drawings and may consist in the employment of a series of holding-clamps 50, associated with the individual rod-stems 34 and 35. These holding-clamps are shown as of the split-sleeve type and working in the threaded openings 51, provided in the base or table-top 1, and also having offstanding handles 52, whereby the same may be readily turned for being tightened upon the rod-stems or loosened up to permit of the free vertical play of such stems. Other equivalent devices could be associated with the rod-stems or in other operative positions for effecting a rigid clamping of the base-rods in their adjusted positions.

It has already been emphasized that the leveling devices of the work-holder are coupled together in such a manner as to insure the synchronous horizontal movement of the rests, whereby a self-leveling action may be always maintained which will cause the opposite pages of a book to be held in the same horizontal plane. It should be added that the form of work-holder described possesses a general utility to meet the varying conditions of the work. Besides the self-leveling action involved, when a book is spread open upon the two rests, with the hub in the interval therebetween, it is obvious that if a flat piece of work of sufficient size to extend entirely across the space between the rests $4^a$ $4^b$ is placed thereon these rests will form a perfect support for the same. For instance, if a very large platen suitable for receiving insurance-blanks, way-bills, and the like was to be employed the work-holder described would fully meet the condition and would require no change whatever in the regular construction, as the oppositely-located rests, by reason of the leveling-levers and the coupling connection for compelling synchronous action, would form a perfect support for the work. From this explanation it will be seen that the work-holder described is susceptible to being used in all ordinary conditions of work, inasmuch as the same will sustain any character of work that may be placed upon it and will automatically keep the work horizontal, it being only necessary that the weight be placed upon both of the rests.

The functions of the different instrumentalities constituting the invention, as well as the utility of the several combinations involved, have already been set forth; but to again emphasize the wide range of modification which may be resorted to in the mounting of the leveling devices, as well as in the coupling together of the separate sets of leveling devices to compel a synchronous movement of the rests, a suggested embodiment of the invention is shown in Figs. 9 and 10 of the drawings. These figures of the drawings are illustrative of the fact that a variety of mechanical expedients may be utilized in the mounting of the leveling-levers, as well as in the coupling together of the separate sets of levers, to secure the results noted.

While the supports 7 and 8 have been preferably referred to as rocking supports of the rock-shaft type, it is obvious that the balancing or leveling effect may be carried out by having supports $7^a$ and $8^b$ fixed or stationary and the leveling-levers 5 and 6 pivotally swung thereon. Such a modification is shown by the illustration of Figs. 9 and 10 of the drawings, and inasmuch as the same involves the thought of having the supports $7^a$ and $8^b$ fixed or stationary it would of course be necessary in this construction to provide different coupling means from those already described. Various forms of connections could obviously be provided for carrying out this part of the invention in connection with fixed or stationary supports for the leveling-levers; but a simple type of coupling is illustrated in Figs. 9 and 10 and may consist of a tie-bar 60, having terminal fast sleeve connections 61, respectively, with the links $8^a$ and 12 (for the separate leveling-levers 5 and 6) beneath each of the rests. A tie-bar of this character and thus arranged between the carrying-links of the separate leveling-levers necessarily provides a coupling connection between the separate sets of levers to insure a true synchronous action or movement thereof and compelling the rests to remain in a horizontal plane.

Other modifications, both in the matter of mounting the leveling devices and also in the coupling means therefor, may be obviously utilized, and it will therefore be understood that various changes in the form, proportion, and minor details of construction may be made within the scope of the invention without departing from the spirit or sacrificing any of the advantages thereof.

Having thus described the invention, what is claimed, and desired to be secured by Letters Patent, is—

1. In a type-writing machine, the combination with a work-support, of simultaneously vertically adjustable main supporting elements, and a machine-supporting frame carried by the latter and shiftable thereon without disturbing the work or the shifting connection with said supporting elements.

2. In a type-writing machine, the combination with a work-support, of oppositely-located simultaneously vertically adjustable base-rods, and a machine-supporting frame carried by the base-rods and shiftable thereon without disturbing the work or the shifting connection with either rod.

3. In a type-writing machine, the combination with a work-support, of oppositely-located vertically-adjustable base-rods, a transversely-shiftable machine-supporting frame carried by said rods and shiftable thereon in either direction without disturbing the work or the shifting connection with the rods, and raising and lowering mechanism for simultaneously adjusting the rods.

4. In a type-writing machine, the combination with the support for the work, of simultaneously vertically adjustable base-rods, a transversely-shiftable machine-supporting frame, an operating means for effecting an independent bodily rising-and-falling movement of the said frame.

5. In a type-writing machine, the combination with the support for the work, of vertically-adjustable base-rods, raising and lowering mechanism for simultaneously and synchronously adjusting said rods, a transversely-shiftable machine-supporting frame, and separate means coöperating with the base-rods and said frame to effect an independent bodily rising-and-falling movement of the latter.

6. In a type-writing machine, the combination with a work-support, of oppositely-located vertically-adjustable base-rods having pendent stems, synchronously-operating levers operatively connected with said stems, and a machine-supporting frame carried by said base-rods and independently adjustable thereon.

7. In a type-writing machine, the combination with the support for the work and a machine-supporting frame, of oppositely-arranged parallel base-rods having pendent stems, raising and lowering mechanism having similar connections with the several stems to effect a synchronous adjustment of the rods, and holding devices associated with the individual rod-stems to provide separate fastenings or locks therefor.

8. In a type-writing machine, the combination with the support for the work and a machine-supporting frame, of oppositely-located base-rods supporting said frame and having pendent stems, raising and lowering mechanism connected with all of the rod-stems to insure a synchronous adjustment of the rods, and manually-operated holding-clamps coöperating with the individual rod-stems to provide separate fastenings or locks therefor.

9. In a type-writing machine, the combination with the support for the work and a machine-supporting frame, of simultaneously vertically adjustable base-rods supporting the frame and provided with pendent rod-stems, raising and lowering mechanism comprising oppositely-arranged rock-shafts, bell-crank levers mounted upon said shafts and coupled together for movement in unison, said bell-crank levers having link connections with the rod-stems, and an operating device including a screw-shaft and a traveling nut on the shaft, the latter having an operative connection with one of the rock-shafts.

10. In a type-writing machine, a support, a transversely-shiftable supporting-frame carried by said support and having front and rear connections therewith, the printing mechanism having a movement on the supporting-frame for letter and line spacing, and a work-holder independently shiftable in the same directions as said frame.

11. In a type-writing machine, an adjustable support, a transversely-shiftable machine-supporting frame carried by the adjustable support and shiftable thereon without disturbing the work or the shifting connections, and a work-holder independently shiftable in the same directions as said frame.

12. In a type-writing machine, a transversely-shiftable machine-supporting frame having a bodily rising-and-falling movement independent of its main support, and a work-holder independently shiftable in the same directions as said frame.

13. In a type-writing machine, a vertically-adjustable main support, a transversely-shiftable machine-supporting frame mounted upon said vertically-adjustable support and having an independent bodily rising-and-falling movement, and a transversely-shiftable work-holder.

14. In a type-writing machine, simultaneously vertically adjustable base-rods, a transversely-shiftable machine-supporting frame mounted upon the base-rods and movable to different positions without disturbing the work or the shifting connections with the rods, and a transversely-shiftable work-holder.

15. In a type-writing machine, simultaneously vertically adjustable base-rods, a transversely-shiftable machine-supporting frame mounted upon the base-rods and having a bodily rising-and-falling movement independent of the latter, and a transversely-shiftable work-holder.

16. In a type-writing machine, the base-rods having one end thereof extending to a point beyond one side of the printing plane, a transversely-shiftable machine-supporting frame supported upon the rods, and a shiftable work-holder having a shifting movement the full length of the base-rods and also beyond one end of the latter.

17. In a type-writing machine, a base having a work-holder opening extending longitudinally thereof, a main support, a transversely-shiftable machine-supporting frame mounted upon the main support and movable to different positions without disturbing the work or the shifting connections with the main support, and a similarly-shiftable work-holder arranged for adjustment within said opening.

18. In a type-writing machine, the base having track-rails, a main support, a transversely-shiftable machine-supporting frame having front and rear connections with said support and shiftable thereon without disturbing the work or the shifting connections, a printing mechanism having movement on the supporting-frame for letter and line spacing, and a work-holder having a carriage riding on said rails and shiftable in the same directions as the machine-supporting frame.

19. In a type-writing machine, a support, a transversely-shiftable machine-supporting frame having front and rear connections with said support and shiftable thereon without disturbing the work or the shifting connections, the printing mechanism having movement on the supporting-frame for letter and line spacing, and a self-leveling work-holder independently shiftable in the same directions as said machine-supporting frame.

20. In a type-writing machine, the work-holder comprising oppositely-arranged vertically-movable rests, and leveling devices embodying a separate coupling connection between the outer edge portion of each rest and the inner edge portion of the other rest.

21. In a type-writing machine, the work-holder comprising vertically-movable horizontal rests arranged in spaced relation, separate supporting elements, and oscillatory leveling-levers mounted upon said supporting elements, the levers upon one supporting element having terminal link connections respectively with the outer edge portion of one rest and the inner edge portion of the other rest, and the leveling-levers on the other supporting element having similar terminal connections respectively with the other edge portions of the same rests.

22. In a type-writing machine, the work-holder comprising oppositely-arranged vertically-movable rests, separate supporting elements, oscillatory leveling-levers mounted upon said supporting elements, the levers upon one supporting element having terminal connections respectively with the outer edge portion of one rest and the inner edge portion of the other rest, and the leveling-levers on the other supporting element having similar terminal connections respectively with the other edge portions of the same rests, and coupling means between the separate sets of leveling devices to insure the synchronous movement of the rests.

23. In a type-writing machine, the work-holder comprising spaced vertically-movable horizontal rests, separate rock-shafts, leveling-levers carried by said shafts and each having operative connections respectively with different edge portions of the separate rests, and a coupling connection between the two rock-shafts to secure synchronous movement thereof.

24. In a type-writing machine, the work-holder comprising spaced vertically-movable horizontal rests, separate rock-shafts, leveling-levers carried by said shafts and each having operative connections respectively with different edge portions of the separate rests, and a coupling connection comprising swinging shaft-arms fitted to the shafts and a connecting-bar pivotally coupling together the said shaft-arms.

25. In a type-writing machine, the combination with a work-support, of simultaneously vertically adjustable main supporting elements, and a machine-supporting frame carried by said supporting elements and adjustable with the latter, to and from the work with the latter in position for printing, without disturbing the work or the connections with the supporting elements.

26. In a type-writing machine, the combination of simultaneously vertically adjustable main supporting elements, a machine-supporting frame carried by said supporting elements and adjustable with the latter, to and from the work, with the latter in printing position without disturbing the work or the connections with the supporting elements, and a transversely-shiftable work-holder.

27. In a type-writing machine, the combination with the work-support, of rising and falling main supporting-rods, and a transversely-shiftable machine-supporting frame carried by said rods and movable to and from the work with the latter in position for printing, without disturbing the work or the connections with the said rods.

In testimony whereof we affix our signatures in presence of two witnesses.

HARRY S. DUKES.
WILLIAM H. CLAYTON

Witnesses:
J. F. WILLS,
PALMER DANAHER.